Patented Jan. 19, 1932

1,842,002

UNITED STATES PATENT OFFICE

FRITZ ZSCHOCH AND HERBERT RODRIAN, OF UNTERROBLINGEN, MANSFELDER SEEKREIS, GERMANY, ASSIGNORS TO THE FIRM A. RIEBECK'SCHE MONTANWERKE AKTIENGESELLSCHAFT, OF HALLE, GERMANY

METHOD OF REFINING CARNAUBA WAX AND SIMILAR VEGETABLE WAXES

No Drawing. Application filed May 26, 1928, Serial No. 280,950, and in Germany October 24, 1927.

This invention relates to the refinement of vegetable waxes, more especially carnauba wax. When treating carnauba wax in the molten state with decolorizing agents, such as, for instance, decolorizing carbon, there is a drawback namely, that a relatively little output of refined wax is obtained, as large quantities of wax are retained by the decolorizing agent; this wax can only be recovered, to a reasonable extent, by its troublesome extraction. Moreover the consumption of decolorizing carbon is great when employing this method.

Now we have found that carnauba wax and the like vegetable waxes, such as candelilla wax, may be advantageously transformed to refined clear waxes by treating the raw or prerefined wax in the dissolved state with decolorizing agents. Highly activated decolorizing carbon, especially that sort which is obtained by carbonizing wood impregnated with zinc chloride solution has proved to be extraordinarily adapted for this purpose. For dissolving the wax, preferably methyl alcohol and its homologues, esters, ketones, such as butanone and ethers, or the compounds of polyvalent alcohols, such as glycol derivatives, &c. come into consideration. Products especially clear and pure are obtained by means of acetic ester as a solvent.

When treating carnauba wax in the dissolved state, especially dissolved in acetic ester, with an activated carbon produced by carbonizing wood impregnated with zinc chloride solution, not only a far better output of cleared wax is obtained as compared with the treatment of molten wax, but also a considerably increased clearing effect is produced when employing equal amounts of carbon. Accordingly with our improved method a considerably smaller amount of carbon is required for effecting an equal degree of clarification.

In carrying out our improved method the starting material is first of all dissolved, preferably in comminuted or ground form, for instance, in hot acetic ester. The solution is mixed with the decolorizing agent by means of stirring or shaking, digested with the decolorant for some time, and then separated from the latter by filtering or centrifugalizing. The refined carnauba wax is obtained with light yellow or even nearly white color by distilling off the solvent from the filtrate.

The recovered solvent may be used again and again for refining further quantities of wax. The wax retained by the decolorant employed may be recovered by extraction with liquids which easily dissolve carnauba wax. The decolorant may be regenerated by calcining it in a current of carbon dioxid or by any other known means.

Instead of causing the whole of the decolorant to act upon the wax solution, it may be added in several steps, for instance, in two portions. Preferably this treatment may be effected according to the counter-current principle, i. e. the solution may be made to flow in one direction and the decolorant passed through the solution in the opposite direction, whereby a further saving and better utilization of the decolorant is attained.

Examples 1. 50 parts of carnauba wax (greasy gray) are dissolved in 400 parts of hot acetic ester. The solution is mixed with 1.25 parts of an activated carbon produced by carbonizing wood impregnated with zinc chloride solution and stirred therewith for one hour. After filtering and distilling off the solvent, a light yellow wax is obtained.

For refining the same carnauba wax in the molten state with the same type carbon to the same degree of clearness, about 5 parts of the same type carbon must be used. In this case the output of clear wax is considerably smaller.

2. 50 parts of the same starting material as in Example 1 are dissolved in 50 parts of acetic ester whereupon the resulting solution is treated in the above described manner with 20 parts of the activated carbon referred to in Example 1. After filtering the solution and evaporating the solvent a nearly white product is obtained.

We claim:—

1. The method of refining carnauba wax and the like vegetable waxes which consists in dissolving the wax in an oxygenated organic solvent, treating the solution with activated carbon, separating the solution from the carbon, and evaporating the solvent 2. The method of refining carnauba wax and the like vegetable waxes which consists in dissolving the wax in ethyl acetate, treating the solution with activated carbon, separating the solution from the carbon and evaporating the solvent.

In testimony whereof we affix our signatures.

FRITZ ZSCHOCH.
HERBERT RODRIAN.